June 20, 1933.   C. G. WOOD   1,914,841
FLUID DAMPENER FOR CLUTCHES
Filed Aug. 9, 1930   2 Sheets-Sheet 1

INVENTOR.
Clarence G. Wood
BY
Fay, Oberlin & Fay
ATTORNEYS

June 20, 1933.　　　　C. G. WOOD　　　　1,914,841

FLUID DAMPENER FOR CLUTCHES

Filed Aug. 9, 1930　　　2 Sheets-Sheet 2

INVENTOR.
Clarence G. Wood
BY
Fay, Oberlin & Fay
ATTORNEYS

Patented June 20, 1933

1,914,841

UNITED STATES PATENT OFFICE

CLARENCE G. WOOD, OF CLEVELAND, OHIO, ASSIGNOR TO THE COLUMBIA AXLE COMPANY, OF CLEVELAND, OHIO, A CORPORATION OF OHIO

FLUID DAMPENER FOR CLUTCHES

Application filed August 9, 1930. Serial No. 474,239.

The present invention relates, as indicated, to fluid dampeners for clutches, and more specifically to a dash pot device for cushioning the sudden shock to the driving system of an automobile, or the like, when the clutch is suddenly engaged. The primary object of the device is to take the sudden shock so occasioned off of the driving system, but a further object is to provide means for preventing a sudden and uncomfortable jerk of the vehicle when the automobile is inexpertly operated. A still further object is to provide means which will prevent jerky progress of an automobile at slow speeds, when the power impulses of an engine of, for instance, the four cylinder type are appreciably spaced apart. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 1:
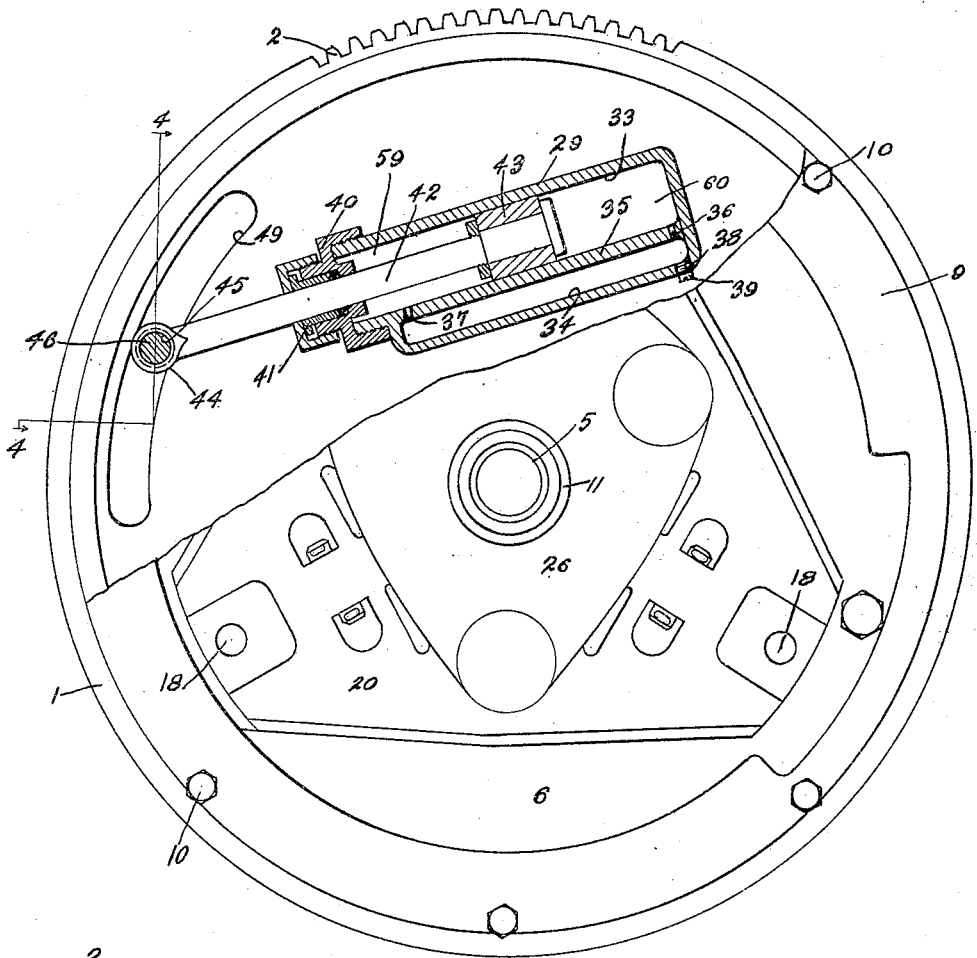
Figure 4:
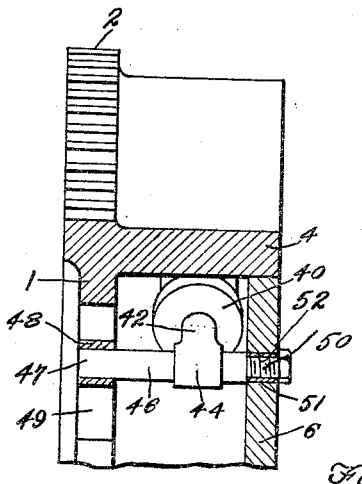
Figure 2:
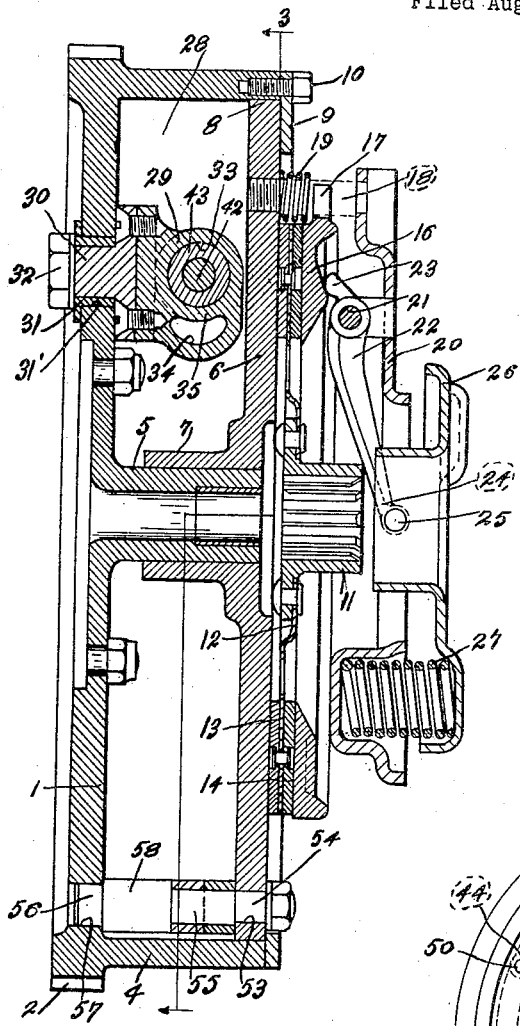
Figure 3:
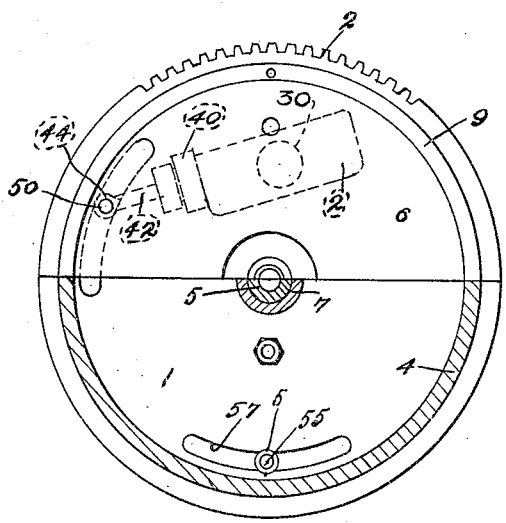

In said annexed drawings:

Fig. 1 is an end elevation of a device of the character described, portions of the front plate and associated elements being broken away for clarity of illustration; Fig. 2 is a transverse vertical section of the device disclosed in Fig. 1; Fig. 3 is a section taken substantially upon the line 3—3 of Fig. 2 on a reduced scale; and Fig. 4 is a detailed section taken substantially upon the line 4—4 of Fig. 1.

Referring more particularly to the drawings, the reference numeral 1 indicates a fly wheel provided with peripheral teeth 2 and with an annular flange 4 adjacent its periphery and extending axially from one face thereof. Said fly wheel is further provided with a central axial hub 5. A disk 6 has its central hub 7 rotatably journalled on the hub 5 of the fly wheel 1, and the peripheral edge 8 of said disk is snugly but rotatably received within the flange 4 of the fly wheel 1. A retaining ring 9 is secured by means of cap screws 10, or the like, to the flange 4 and projects over the edge of the disk 6 to hold the same against displacement.

A propeller shaft (not shown) is adapted to be aligned with and journalled in the hub 5 of the fly wheel 1, and a hub 11 is adapted to be splined on said shaft. A resilient clutch plate 12 is secured to said hub 11 and carries adjacent its periphery friction rings 13 and 14 on its opposite faces. A clutch ring 16 having a plurality of bifurcated radial extensions 17 is mounted adjacent said plate 12, said ring being supported in position by engagement of the bifurcated projections 17 with bolts 18 projecting from the face of the disk 6. Each of said bolts 18 is surrounded by a coiled spring 19, one end of which bears against the disk 6 and the other end of which bears against the bifurcated projections 17 of the ring 16, tending to move said ring away from said disk 6. A bracket 20 secured to the outer end of said bolts 18 provides a journal for a pin 21 upon which is pivotally mounted a lever 22. One end 23 of said lever is adapted to cooperate with a cam face formed on said ring 16, while the opposite end 24 thereof is pivoted as at 25 to a clutch operating member 26 sleeved on said propeller shaft (not shown) and connected to the clutch actuating pedal. Said member 26 and bracket 20 are provided with registering sockets receiving the opposite ends of coiled springs 27 which tend to move said member 26 outwardly away from said disk 6 to press the ring 16 into contact with the plate 12.

It will be seen that, since the springs 27 are much heavier than the springs 19, the ring 16 is normally pressed against the friction ring 14 carried by the plate 12, and the force exerted by the springs 27 is sufficient to flex the plate 12 to move the friction ring 13 into intimate contact with the disk 6. If the clutch actuating pedal be operated to move the member 26 toward the left as viewed in Fig. 2, the end 23 of the lever 22 releases its pressure upon the ring 16 and the springs 19 move said ring toward the right as viewed in Fig. 2, whereupon the inherent resiliency of the plate 12 causes said plate to move to carry said friction ring 13 out of contact with the disk 6. I do not claim novelty in the operating means for the clutch above described.

It will be seen that the fly wheel 1 and its flange 4 cooperate with the disk 6 to form a space or chamber 28. Within this chamber 28 there is mounted a cylinder housing 29, and a lug or hub 30 projects laterally from said housing. This hub is shown attached to the housing by means of screws, but it is to be understood that the same may as well be formed integrally with said housing. The hub 30 is rotatably mounted in a bushing 31 secured in a suitably formed aperture 31' in said fly wheel 1, said aperture being formed at a point removed from the axis of said fly wheel. The hub 30 is secured in place by a cap screw 32 threaded into said hub and bearing upon the external surface of the bushing 31.

Referring now more particularly to Fig. 1, it will be seen that the housing 29 provides a cylindrical chamber 33 and a smaller by-pass chamber 34, said chambers being placed in communication through restricted apertures 36 and 37 formed in the wall 35 separating said chambers, said apertures being formed adjacent the opposite ends of said by-pass chamber 34. A filling and drain aperture 38 is formed in the lower wall of said chamber 34 and is adapted to be closed by a plug 39.

The open end of the housing 29 is closed by a cap 40 provided with the usual packing gland 41, and the stem 42 of a piston 43 mounted in the chamber 33 extends outwardly through said cap and said gland.

The outer end 44 of said stem 42 is bored as at 45 for rotatably receiving a pin 46. One end 47 of said pin 46 carries a roller 48, said roller being received in an arcuate slot 49 formed adjacent the periphery of the fly wheel 1. The opposite end 50 of said pin 46 carries a bushing or roller 51 which is snugly received in an aperture 52 formed in the disk 6. Obviously, the slot 49 and the aperture 52 are equally spaced from the axis of the fly wheel 1 and of the disk 6.

The disk 6 is further provided with one or more apertures 53 in each of which is received one end 54 of a pin 55, the other end 56 of each of said pins being received in an arcuate slot 57 in the fly wheel 1. Spacer sleeves 58 are mounted on said pins 53 to prevent said disk 6 from shifting axially toward said fly wheel 1.

The operation of the device is as follows. Presuming that the engine is running and that the fly wheel 1 is thus being rotated in a clockwise direction as viewed in Fig. 1, it will be seen that the disk 6 will likewise be rotated in the same direction. If the member 26 has been moved toward the left to release the engagement of the ring 16 with the plate 12, the automobile will be stationary. If the clutch pedal is now suddenly released, the springs 27 will act quickly to cause the clutch ring 16 to force the friction ring 13 into sudden engagement with the disk 6. Obviously, the disk 6 will tend to stop because of this engagement, and, because of the connection between the disk 6 and the fly wheel 1, which permits a limited relative rotation thereof, the fly wheel 1 will rotate slightly in a clockwise direction with respect to said disk 6.

Since the slot 49 is concentric with the fly wheel 1, and since the hub 30 is mounted at a point eccentric with respect thereto, such relative movement of the fly wheel 1 with respect to the disk 6 will cause a rotation in a counterclockwise direction of the casing 29 about the hub 30. Such movement will likewise cause the piston 43 to move toward the left in the cylinder 33 as viewed in Fig. 1. But such movement is resisted by the liquid in said chamber, and can progress only at a speed limited by the speed at which liquid can flow through the restricted apertures 37 and 36 from the end 59 of the chamber 33 to the end 60 thereof. Thus it will be seen that the operation of the device, when considered by increments, is substantially as follows. As the clutch "grabs" or takes hold suddenly, the rotation of the disk 6 is stopped completely for an infinitesimal fraction of a second. Almost immediately, the pin 45 is pulled downwardly, as viewed in Fig. 1, in the slot 49 to move the piston 43 toward the left, as viewed in Fig. 1. The resistance to such movement set up by the liquid in the cylinder 33 causes the disk 6 to be picked up slowly and gradually, and said piston will continue to move at a more and more decreased speed until the disk 6 has been picked up to a speed of rotation synchronous to that of the fly wheel 1.

Correspondingly, when the automobile is running at a relatively high speed, and the throttle is suddenly closed, or the brake is applied while the clutch is engaged, the disk 6 will tend to rotate faster than the fly wheel 1 which will cause cushioned movement of the piston 43 toward the right as viewed in Fig. 1. If the action of the engine is erratic, or if the power impulses are transmitted to the fly wheel in appreciable spurts, the jerks which would otherwise be transmitted to the drive shaft are absorbed in the dash pot arrangement above described.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. The combination with a drive wheel having a hub projecting from one face thereof, of a disk mounted on said hub for rotation relative thereto, a liquid containing cylinder formed with a by-pass chamber connecting the ends of its bore, said cylinder being pivotally mounted on said drive wheel and exteriorly enclosed by said disk, a lateral projection on said cylinder said projection being journalled in an aperture in said wheel, and a piston closely fitting the bore of said cylinder and having a stem projecting beyond the end of said cylinder, the projecting end of said stem being pivotally connected to said disk.

2. The combination with a drive wheel having a hub projecting from one face thereof, of a disk mounted on said hub for rotation relative thereto, a cylinder formed with a by-pass chamber connecting the ends of its bore, a lateral projection on said cylinder, said projection being journalled in an aperture formed in said wheel at a point removed from the axis thereof, a piston closely fitting the bore of said cylinder and having a stem projecting beyond the end of said cylinder, said wheel being formed with an arcuate slot concentric with said wheel, and a pin passing through a transverse bore in the end of said stem and having one end received in said slot and the other end secured to said disk.

3. The combination with a drive wheel having a hub projecting from one face thereof, of a disk mounted on said hub for rotation relative thereto, a cylinder, a piston mounted against resistance in said cylinder, a lateral projection on said cylinder, said projection being journalled in an aperture formed in said wheel at a point removed from the axis thereof, said piston closely fitting the bore of said cylinder and having a stem projecting beyond the end of said cylinder, said wheel being formed with an arcuate slot concentric with said wheel, and a pin passing through a transverse bore in the end of said stem and having one end received in said slot and the other end secured to said disk.

4. The combination with a drive wheel having a hub and an annular flange projecting from one face thererof, of a disk journalled on said hub, a clutch plate positioned adjacent said disk, a clutch ring mounted adjacent said plate, friction rings mounted on said clutch plate and adapted to cooperate with said disk and with said clutch ring, spring means urging said clutch ring away from said disk, stronger spring means urging said clutch ring toward said disk, means for overcoming said last-named spring means, and a hydraulic torque absorption means enclosed between said drive wheel and said disk.

5. The combination with a drive wheel having a hub and an annular flange projecting from one face thereof, of a disk journalled on said hub, a clutch plate positioned adjacent said disk, a clutch ring mounted adjacent said plate, friction rings mounted on said clutch plate and adapted to cooperate with said disk and with said clutch ring, spring means urging said clutch ring away from said disk, stronger spring means urging said clutch ring toward said disk, means for overcoming said last-named spring means, and fluid cushioned means enclosed between said drive wheel and said disk for limiting the relative rotation between said drive wheel and said disk.

6. The combination with a drive wheel having a hub and an annular flange projecting from one face thereof, of a disk journalled on said hub, a clutch plate positioned adjacent said disk, a clutch ring mounted adjacent said plate, friction rings mounted on said clutch member and adapted to cooperate with said disk and with said clutch plate, spring means urging said clutch ring away from said disk, stronger spring means urging said clutch ring toward said disk, means for overcoming said last-named spring means, and cushioned connecting means enclosed between said drive wheel and said disk comprising a cylinder formed with a bore and with a by-pass chamber, said chamber having communication with opposite ends of said bore through restricted ports, a lateral projection on said cylinder, said projection being journalled in an aperture formed in said wheel at a point removed from the axis thereof, a piston closely fitting the bore of said cylinder and having a stem projecting beyond the end of said cylinder, said wheel being formed with an arcuate slot concentric with said wheel, and a pin passing through a transverse bore in the end of said stem and having one end received in said slot and the other end secured to said disk.

Signed by me this 5th day of August, 1930.

CLARENCE G. WOOD.